United States Patent
Goscenski

[15] 3,677,138
[45] July 18, 1972

[54] MECHANISM FOR HYDRAULIC BRAKE BOOSTER

[72] Inventor: Edward J. Goscenski, Marshall, Mich.
[73] Assignee: The Bendix Corporation
[22] Filed: Nov. 19, 1970
[21] Appl. No.: 90,930

[52] U.S. Cl. ................................. 91/373, 91/378
[51] Int. Cl. ........................................... F15b 9/10
[58] Field of Search .............. 91/373, 372, 370, 371, 434, 91/378

[56] References Cited

UNITED STATES PATENTS

| | | | |
|---|---|---|---|
| 3,054,387 | 9/1962 | Kellogg | 91/373 |
| 3,532,027 | 10/1970 | MacDuff | 91/372 |

Primary Examiner—Paul E. Maslousky
Attorney—Ken C. Decker and Plante, Hartz, Smith & Thompson

[57] ABSTRACT

A hydraulic brake booster is disclosed which includes a boost piston slidably mounted in a housing. A spool valve is slidably mounted in the piston and is shiftable from a first position venting the housing to a fluid reservoir to a second position communicating the housing with a pressure source. An operator-actuated input rod engages one end of the spool valve for shifting the latter. A compartment in the other end of the spool valve is communicated to the pressure source as the valve is shifted. A sliding plunger extends from the compartment to pressurize the fluid received in the latter whereby the force due to fluid pressure in the compartment is transmitted to the actuating rod to retard movement of the latter thereby providing braking "feel" to the vehicle operator.

7 Claims, 1 Drawing Figure

PATENTED JUL 18 1972 3,677,138
INVENTOR.
EDWARD J. GOSCENSKI
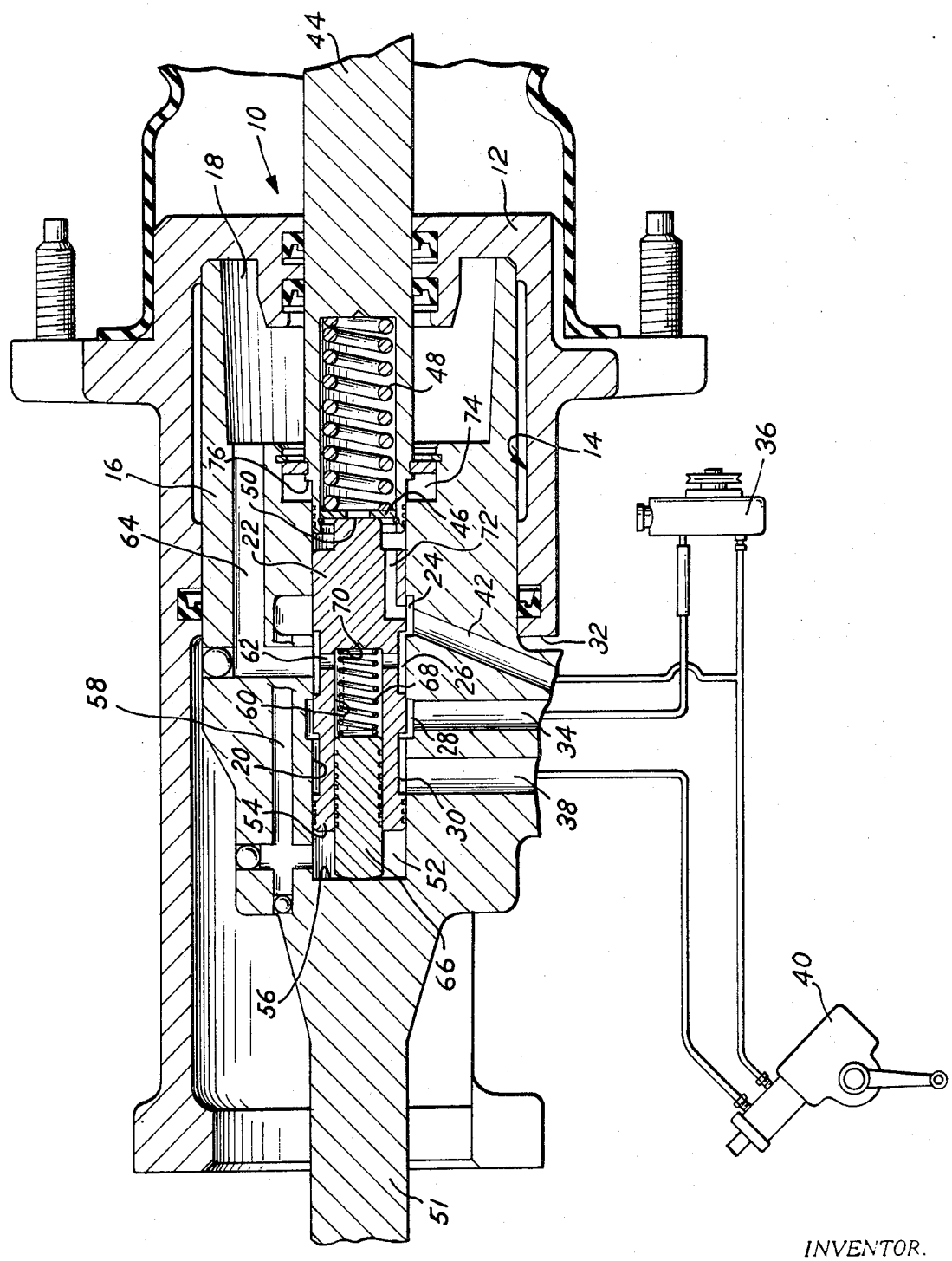

MECHANISM FOR HYDRAULIC BRAKE BOOSTER

BACKGROUND OF THE INVENTION

This invention relates to a hydraulic brake booster.

In order to reduce the force required to operate the brakes of the vehicle to an acceptable level, it has become necessary to provide a power assist to aid the vehicle operator when a brake application is effected. Although most existing power brake units are vacuum operated, future units are expected to use high pressure hydraulic fluid as a power source.

Existing hydraulic booster units of the "concentric" design type provide an operator-operated input rod that shifts a spool valve which is slidably mounted within the booster piston to admit fluid into the booster housing to shift the piston. However, in any commercially acceptable power brake unit, movement of the input rod must be resisted by a force proportional to the braking force being developed to provide proper braking "feel" to the vehicle operator. Existing hydraulic brake boosters provide "feel" by permitting the high pressure hydraulic fluid to act against the spool valve or the input rod to retard movement of the latter. However, the amount of "feel" in existing devices is governed by the cross sectional area of the valve spool or input rod. In order to change the proportion of brake "feel" to the braking force being developed, it is necessary to change the size of these components. This is often inconvenient or impractical.

SUMMARY OF THE INVENTION

Therefore, an important object of my invention is to provide a hydraulic brake booster in which the reaction force transmitted to the vehicle operator is independent of the cross-sectional area of the valve spool or input rod.

Another important object of my invention is to provide a brake booster design in which the reaction force transmitted to the vehicle operator may be varied by changing a relatively small number of components.

DESCRIPTION OF THE DRAWING

The sole FIGURE of the drawing is a schematic illustration of a vehicle hydraulic system with a brake booster made pursuant to the teachings of my present invention illustrated in cross section.

DETAILED DESCRIPTION

Referring now to the drawing, a brake booster 10 includes a housing 12 defining a bore 14 therewithin. A piston 16 is slidably mounted in the bore 14 and cooperates with one end of the latter to define a variable-volume boost chamber 18 therebetween. A second bore 20 is provided within the piston 16 which slidably carries a spool valve 22. The outer periphery of the spool valve 22 and the wall of the bore 20 are provided with spaced annular recesses that cooperate with one another to define fluid cavities 24, 26, 28, and 30.

A portion of the housing 12 is cut away to define an opening 32 extending therethrough. A portion of the piston 16 extends through the opening 32 and houses an inlet port 34 which communicates the cavity 28 with the outlet of the power steering pump 36 of the vehicle, an outlet port 38 which communicates the cavity 30 with the inlet of a power steering gear 40, and a return or exhaust port 42 communicates the cavity 24 with the inlet or low pressure side of the pump 36. The outlet of the gear 40 is also communicated with the inlet of the pump 36.

An operator-operated input rod 44 extends from the housing 12. One end of the rod 44 is connected to the usual brake pedal (not shown) mounted in the operator's compartment of the vehicle. The other end of the rod 44 is slidably received in one end of the second bore 20. Rod 44 carries a plate 46 which is urged into engagement with an abutment carried by the rod 44 by a spring 48. The plate 46 engages one end 50 of the spool valve 22. The rod 44 is adapted to shift the valve 22 to the left viewing the Figure when the vehicle operator effects a brake application by forcing the rod 44 to the left. A rod 51 connects the piston 16 with a standard automotive master cylinder (not shown). Movement of the rod 51 develops pressure in the master cylinder in the normal manner for applying the brakes of the vehicle.

Another fluid cavity 52 is defined between the other end 54 of the spool valve 22 and the closed end 56 of the second bore 20. The cavity 52 is communicated to the cavity 24, and therefore to the inlet of the pump 36, by a passage 58 within the piston 16.

The end 54 of valve 22 is counterbored to provide a fluid compartment 60 within the valve 22. The compartment 60 is communicated to the cavity 26 by passages 62. Another passage 64 communicates the cavity 26 to the chamber 18. A plunger 66 is slidably and sealingly received within the open end of the compartment 60. A spring 68 normally urges the end of the plunger 66 into engagement with the closed end 56 of the bore 20. Still another passage 72 is provided to vent the chamber housing the spring 48 to the fluid reservoir.

MODE OF OPERATION

In operation, when the brakes of the vehicle are released, the various components are disposed as illustrated in the Figure. In this position, the cavity 26 is communicated to the cavity 24 so that the chamber 18 is vented to the low pressure side of the pump 36 through the passage 64, cavities 26 and 24, and the exhaust port 42. The cavity 28 is communicated to the cavity 30 so that substantially all of the fluid flowing into the inlet port 34 is communicated directly to the outlet port 38.

When a brake application is effected, the input rod 44 is urged to the left (viewing the Figure), thereby also urging the spool valve 22 to the left. As the spool valve 22 shifts, communication between the cavities 24 and 26 is terminated, and a metering orifice is opened between the cavities 26 and 28 to communicate a small amount of the fluid flowing through the inlet port 34 into the cavity 26. High pressure fluid is communicated from the cavity 26 to chamber 18 through the passage 64. High pressure fluid in the chamber 18 acts upon the end of the piston 16 to shift the latter to the left (viewing the Figure) to develop pressure in the master cylinder (not shown) to apply the brakes of the vehicle.

High pressure fluid in the cavity 26 is also communicated into the compartment 60 through the passage 62. Fluid in the compartment 60 acts against the end 70 of the compartment 62 to exert a force on the spool valve opposing movement of the rod 44. Also, fluid pressure in the chamber 18 is communicated into the chamber 74 where it acts on the annular area 76 to oppose movement of the rod 44. The sum of the forces acting on the areas 70 and 76 are transmitted to the vehicle operation to provide braking "feel". These forces increase proportionally as the fluid pressure level in the chamber 18 increases. When the force due to fluid pressure action on the area 70 is large enough to collapse the spring 48, the input rod 44 moves relative to the spool valve 22. Since further movement of the rod 44 does not shift the spool valve 22, the maximum pressure in the chamber 18 is limited to a predetermined level.

As will be appreciated by those skilled in the art, the cross sectional area of the compartment 60 may be made larger or smaller as desired. Therefore, the portion of the fluid force being developed in the chamber 18 that is transmitted to the vehicle operator may be varied to suit a particular vehicle manufacturer's preference without requiring a change in the cross sectional area of the spool valve 22 or the bore 20. Also, the fluid pressure forces acting on the end 54 of valve 52 are small enough so that the spring 48 may be made relatively small and inexpensive.

I claim:

1. In a hydraulic brake booster for use in a vehicle hydraulic system having a fluid reservoir and a pressure source:
   a housing defining a bore therewithin;

a piston slidable in said bore defining a variable-volume chamber between one end of the piston and a corresponding end of the housing;

valve means shiftable within said housing from a first position venting said chamber to said fluid reservoir to a second position communicating said chamber with said pressure source;

operator-operated means engaging one end of the valve means for shifting the latter;

a compartment defined within said valve means communicated to said pressure source as the valve means is shifted toward the second position;

a plunger extending into said compartment for pressurizing the fluid contained therein as the valve means is shifted whereby fluid pressure developed in said compartment acts on said valve means to oppose movement of the latter; and a second bore defined within said housing;

said valve means including a valve spool slidably mounted in said second bore;

the other end of said spool valve cooperating with a corresponding end of said bore to define a variable volume cavity therebetween;

said cavity being vented to said reservoir;

said compartment having an open end and a closed end;

one end of said plunger being slidably received within said open end;

the other end of said plunger being adapted to engage said corresponding end of said second bore.

2. The invention of claim 1; and resilient means within said compartment yieldably urging said plunger toward said corresponding end of the second bore.

3. In a hydraulic brake booster for use in a vehicle hydraulic system having a fluid reservoir and a pressure source:

a housing defining a bore therewithin;

a piston slidable in said bore defining a variable-volume chamber between one end of the piston and a corresponding end of the housing;

valve means shiftable within said housing from a first position venting said chamber to said fluid reservoir to a second position communicating said chamber with said pressure source;

operator-operated means engaging one end of the valve means for shifting the latter;

a compartment defined within said valve means communicated to said pressure source as the valve means is shifted toward the second position; and a plunger extending into said compartment for pressurizing the fluid contained therein as the valve means is shifted whereby fluid pressure developed in said compartment acts on said valve means to oppose movement of the latter;

said piston defining a second bore therewithin;

said valve means including a valve spool slidably mounted in said second bore and cooperating with one end thereof to define a variable volume cavity therebetween;

said plunger extending from said compartment for engagement with said one end of the second bore.

4. The invention of claim 3; and resilient means yieldably urging said plunger into engagement with said one end of the second bore.

5. The invention of claim 3; and passage means communicating said cavity with the fluid reservoir.

6. In a hydraulic brake booster for use in a vehicle hydraulic system having a fluid reservoir and a pressure source:

a housing defining a bore therewithin;

a piston slidable in said bore defining a variable-volume chamber between one end of the piston and a corresponding end of the housing;

valve means shiftable within said housing from a first position venting said chamber to said fluid reservoir to a second position communicating said chamber with said pressure source;

operator-operated means engaging one end of the valve means for shifting the latter;

reaction means operative on said valve means for resisting movement of the latter with a force proportional to the fluid pressure level in said variable volume chamber;

said reaction means including a compartment in the other end of said valve means communicated to the fluid pressure level developed in said pressure chamber, said compartment having an open end, a plunger slidably received in said open end, and abutment means engaging said plunger to permit movement of the valve means with respect to the plunger.

7. The invention of claim 6:

a second bore defined within said housing;

said valve means including a spool valve slidably mounted in said second bore;

said abutment means being an end of said second bore.

* * * * *